United States Patent [19]

Tarn et al.

[11] Patent Number: 5,074,683
[45] Date of Patent: Dec. 24, 1991

[54] FIBER OPTIC FACEPLATES AND METHOD OF MOUNTING SAME

[75] Inventors: Terry Tarn, Pittsford; Edward Carnall, Jr.; David N. Bull, both of Rochester, all of N.Y.

[73] Assignee: Eastman Kodak Company, Rochester, N.Y.

[21] Appl. No.: 610,625

[22] Filed: Nov. 8, 1990

[51] Int. Cl.⁵ .................... G02B 6/08; B65H 69/02; H01J 5/16
[52] U.S. Cl. .................... 385/120; 385/116; 385/89; 156/99; 156/106; 156/158; 250/227.11; 250/227.28
[58] Field of Search ............ 350/96.10, 96.15, 96.24, 350/96.25, 96.26, 96.27, 96.28, 320; 250/227.11, 227.28; 156/99, 102, 106, 158; 357/17, 19, 30, 45

[56] References Cited

U.S. PATENT DOCUMENTS

| | | | |
|---|---|---|---|
| 3,622,419 | 11/1971 | London et al. | 350/96.27 X |
| 4,588,261 | 5/1986 | Erhardt | 350/167 |
| 4,601,537 | 7/1986 | Saccocio | 350/96.27 |
| 4,669,813 | 6/1987 | Jeskey | 350/96.27 |
| 4,820,013 | 4/1989 | Fuse | 350/96.27 |
| 4,978,195 | 12/1990 | Takano et al. | 350/96.27 |
| 5,005,029 | 4/1991 | Fuse | 350/96.27 X |
| 5,029,975 | 7/1991 | Pease | 350/96.27 |

FOREIGN PATENT DOCUMENTS 58-152217  9/1983  Japan ................ 350/96.27 X

Primary Examiner—Brian Healy

[57] ABSTRACT

Method and apparatus are disclosed for mounting a second optical component on a first optical component using a spacer layer for forming a controlled gap between the two components. In a preferred embodiment, a CCD sensor is formed having a non-active area and an active area for detecting lightwaves. A spacer layer of an epoxy or similar material is formed on at least a portion of the non-active area of the sensor. A fiber optic faceplate is mounted on the spacer layer to form the controlled gap between the active area of the CCD sensor and the faceplate. The fiber optic faceplate has a predetermined index of refraction for passing lightwaves towards the active area of the sensor. A coupling compound, having an index of refraction which substantially matches that of the faceplate, is used to fill the controlled gap between the faceplate and the active area of the sensor.

17 Claims, 2 Drawing Sheets

FIBER OPTIC FACEPLATES AND METHOD OF MOUNTING SAME

FIELD OF THE INVENTION

The present invention relates to a technique for mounting fiber optic faceplates to devices such as CCD sensors.

BACKGROUND OF THE INVENTION

A fiber optic faceplate is a commercially available element which is formed of, for example, glass and is further processed by grinding and polishing its opposing major surfaces. One of the two opposing surfaces of the faceplate is then attached to a device such as, for example, a CCD sensor. The device is then positioned in an optical circuit or system, and a suitably formed end of an optical fiber is contacted or attached to the second opposing major surface of the faceplate.

A first faceplate mounting technique currently in use calls for mounting a fiber optic faceplate directly onto the surface of the sensor or other device with a thin coating of optical coupling compound therebetween. The faceplate is then locked into place with an epoxy or similar resin. While this technique keeps a gap between the faceplate and the sensor to a minimum, there is a problem of mounting the faceplate without causing damage to the active area of the sensor or to the surface of the faceplate. Also, variations in the gap between the sensor and faceplate can occur where the surface of the sensor is uneven.

A second faceplate mounting technique currently in use calls for holding the fiber optic faceplate in a fixture which can monitor the image of the faceplate as the position of the faceplate is adjusted over the sensor. When the image is in a satisfactory position, the faceplate is locked into place with an epoxy or similar resin. The problem with the second faceplate mounting technique is that it is slow. It is to be understood that an optical coupling compound is used between the sensor and the faceplate in the first and second faceplate mounting techniques. This coupling compound is a gel having an index of refraction which provides desired light transmission characteristics.

The most common problem associated with mounting fiber optic faceplates to devices such as CCD sensors is poor gap control between the faceplate and the sensor or device due to variations in dimensions of the package, the sensor or device, or the faceplate. These variations in dimensions can appear from sensor to sensor, or across one sensor. In a sensor, a gap larger than, for example, 100 microns, or a non-uniform gap, affects the Contrast Transfer Function of each pixel of the sensor by allowing light to spill over into adjacent pixels. Damage to the sensor or faceplate can also result from non-uniform gaps.

It is desirable to be able to quickly and consistently make a good optical coupling between a fiber optic faceplate and a CCD sensor without causing damage to the CCD sensor.

SUMMARY OF THE INVENTION

The present invention is directed to a method and apparatus for mounting a second optical component (such as a fiber optic faceplate) on a first optical component (e.g., a CCD sensor). More particularly, the method comprises the steps of forming a spacer layer on at least a portion of a surface of the first optical component, and mounting the second optical component on the spacer layer for forming a controlled gap between the second optical component and the surface of the first optical component.

The apparatus relates to an optical device comprising first and second optical components and a spacer layer. The first optical component comprises a surface. The spacer layer cover covers a portion of the surface of the first optical component. The second optical component has a predetermined index of refraction and is mounted on the spacer layer to form a controlled gap between the active area of the first optical component and the second optical component. A coupling compound, having an index of refraction which substantially matches the index of refraction of the second optical component, is preferably introduced to fill the controlled gap between the active area of the first optical component and the second optical component formed by the spacer layer.

The method and apparatus according to the present invention provide an efficient technique for controlling a gap between the first and second optical components without concern for tolerance variations in the various components.

The invention will be better understood from the following more detailed description taken with the accompanying drawings and claims.

The drawings are not necessarily to scale.

DETAILED DESCRIPTION

Figure 1:
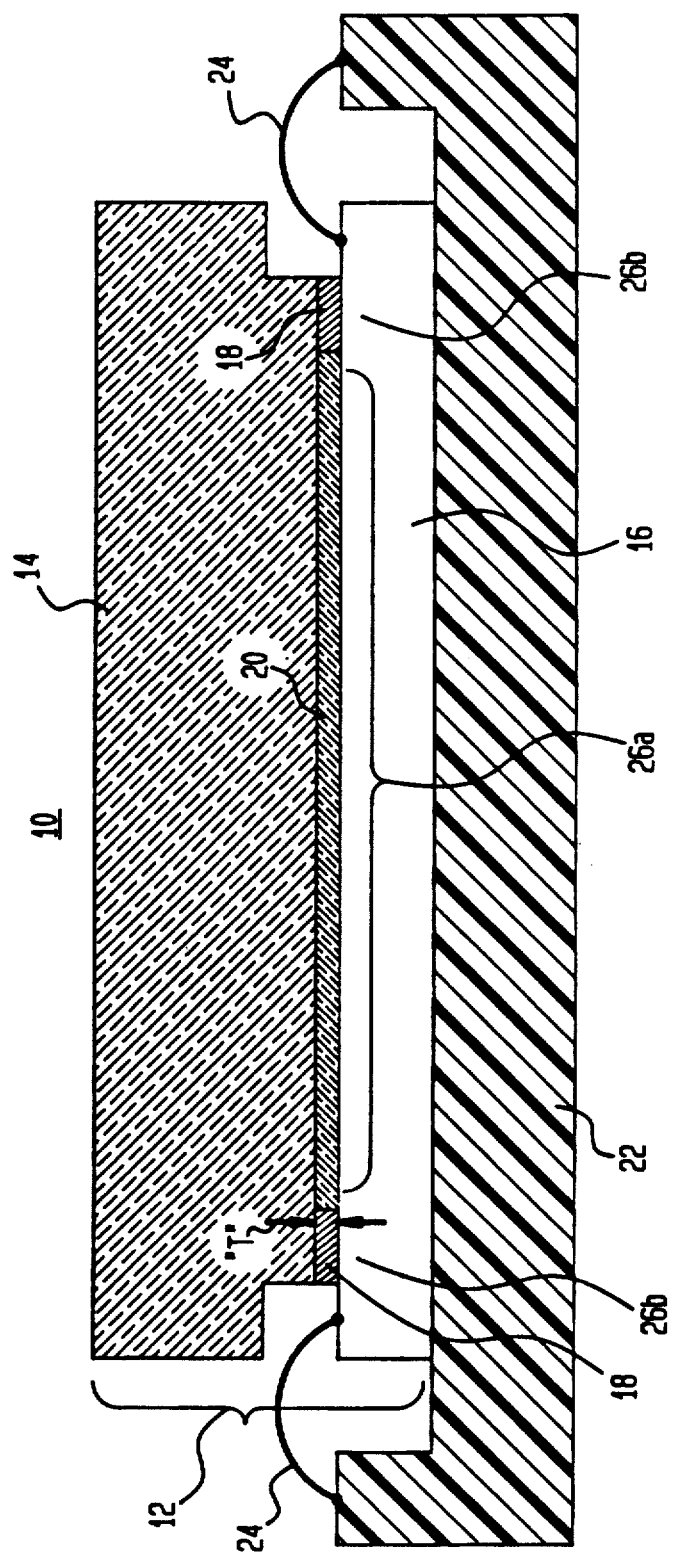
FIG. 1 is a cross-sectional view of a fiber optic faceplate mounted on a CCD sensor in accordance with the present invention.

Referring now to FIG. 1, there is shown a cross-sectional view of a device 10 comprising a sensor assembly 12 in accordance with the present invention. Sensor assembly 12 comprises a fiber optic faceplate 14, a CCD sensor 16, a spacer layer 18, and a coupling material 20 placed between faceplate 14 and sensor 16. The CCD sensor 16 comprises an active area 26a (within the area essentially bounded by the large bracket shown in FIG. 1) responsive to lightwaves and a non-active area 26b (outside of the ends of the arrows). The sensor assembly 12 is mounted on a carrier 22, and wire bonds 24 are used for interconnecting appropriate contact pads (not shown) on the sensor 16 and the carrier 22 for providing electrical connections to desired remote circuits (not shown).

The spacer layer 18 (having a predetermined thickness T and typically being an epoxy or similar material) is disposed on at least a portion of the non-active area 26b of the sensor 16. An optical coupling material 20 is provided over the active area 26 of the sensor 16, and is contained by the spacer layer 18. The fiber optic faceplate 14 is positioned on the spacer layer 18 to contact the optical coupling material 20 and in a manner to avoid bubbles from forming in the optical coupling material 20. Once positioned, the fiber optic faceplate 14 is sealed in place with an adhesive (not shown).

Figure 2:
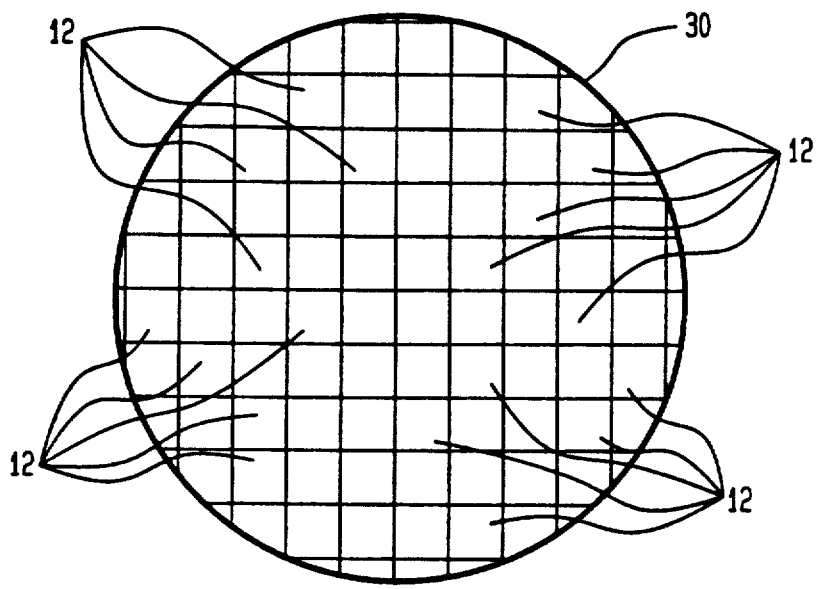
FIG. 2 is a top view of a wafer comprising a plurality of sensor assemblies formed thereon in accordance with the present invention.

Referring now to FIG. 2, there is shown a wafer 30 on which a plurality of CCD sensor assemblies 12 are formed. It is to be understood that in FIG. 2, each of the complete rectangular outlines on the surface of wafer 30 is usable for producing a CCD sensor assembly 12, while the remaining non-rectangular areas are subsequently discarded. Therefore, the first step in forming the device 10 of FIG. 1 is to form the wafer 30 and the plurality of CCD sensors 16 thereon by any suitable process or processes.

Once the plurality of CCD sensors 16 are formed on wafer 30, the second step is to form the spacer layer 18 on at least a portion of the non-active area of the surface of each of the sensors 16 using an epoxy or similar spacer material. The spacer layer 18 is preferably formed concurrently on each of the CCD sensors 16 of wafer 30 using any suitable process such as, for example, by screen printing. It is to be understood that the spacer layer 18 should have a predetermined thickness T (e.g., 0.6 mil) which is based on the functioning of the fiber optic faceplate 14 to be placed thereon. The functioning of the fiber optic faceplate 14 is dependent on its shape, dimensions, and the properties (e.g., index of refraction, numerical aperture) of the material forming the faceplate 14. The predetermined thickness of spacer layer 18 is primarily determined by experimentation for each different type of assembly 12 being manufactured. For example, where a screen printing process is used to concurrently form the spacer layers 18 on the CCD sensors 16 of wafer 30, it is to be understood that the combination of, for example, the size of the mesh of the screen being used and the thickness of the emulsion being used to form the spacer layers 20 are major factors that determine the thickness T of the deposit forming each of the spacer layers 18. After the spacer layers 18 have been formed by screen printing on the plurality of CCD sensors 16, the spacer material forming the spacer layers 18 is heated to polymerize the resin, and the wafer 30 is sawn or diced along the lines in FIG. 2 by any suitable means to produce the individual sensor assemblies 12.

Figure 3:
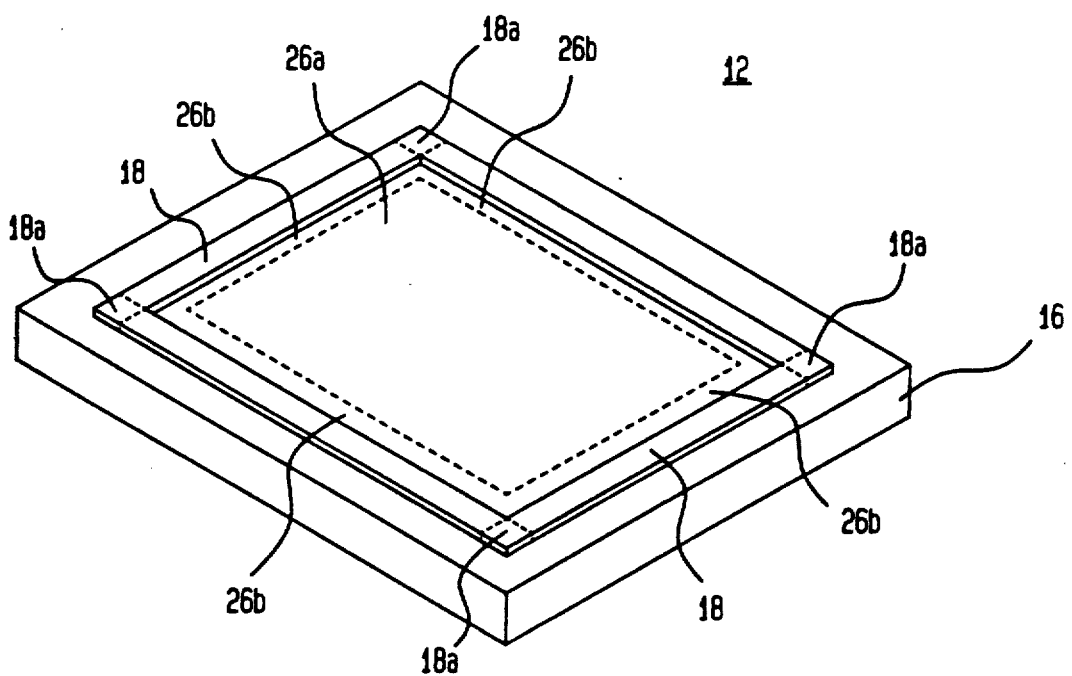
FIG. 3 is an enlarged view in perspective of one of the sensor assemblies of the wafer of FIG. 2.

Referring now to FIG. 3, there is shown an enlarged view in perspective of one of the CCD sensor assemblies 12 comprising the sensor 16 and spacer layer 18 formed around the active area 26 of sensor 16. The spacer layer 18 totally surrounds the active area 26a so as to provide support for the fiber optic faceplate 14 when it is placed thereon. In a presently preferred embodiment, only four corner portions 18a (shown within adjacent pairs of perpendicular dashed lines) of layer 18 are used to support the fiber optic faceplate 14. The use of just corner portions 18a effectively generates vent holes which allow any gas bubbles entrapped between the fiber optic faceplate 14 and the CCD sensor 16 to be removed by subjecting the device 10 to a vacuum. Each individual sensor assembly 12 is then mounted onto a particular carrier or package 22, as shown in FIG. 1, and wire-bonded (using wire bonds 24) to electrically connect contact pads (not shown) on the sensor 16 to the proper contact pads (not shown) on the carrier or package 22.

The optical coupling material 20 is then placed on the active area 26 of sensor 16 and between spacer layer 18 to at least the height T of the spacer layer 18. It is to be understood that the coupling material can be any suitable material such as, for example, a gel which is available from companies making such product as, for example, Dow Corning. The purpose of the coupling material 20 is to match the index of refraction between the glass of the faceplate 14 and the silicon dioxide of the exemplary CCD sensor. In other words, the controlled gap between the faceplate 14 and the sensor 16 is filled with a coupling material (optical gel) that has the same properties (e.g., index of refraction) as the material (e.g., glass) of fiber optic faceplate 14.

The fiber optic faceplate 14 is then positioned on the spacer layer 18 to contact the optical coupling material 20 in a manner that avoids bubbles in the optical coupling material 20. Typically, the faceplate 14 can be inclined to contact one side of the faceplate 14 with the spacer layer 18, and then the angle of incline of the faceplate 14 is slowly lowered until the faceplate is in complete contact with the spacer layer 18. With care, such procedure should avoid bubbles from forming in the coupling material 20. Once the faceplate 14 is positioned on spacer layer 18, the fiber optic faceplate 14 is sealed in place (along a portion or the whole of its edge) with an adhesive (not shown) or other suitable sealer. Subsequently, the end of an optical fiber (not shown) would be placed in contact with the major surface of the fiber optic faceplate 14 opposite the major surface in contact with spacer layer 18 and coupling material 20.

It is to be understood that the specific embodiments described herein are intended merely to be illustrative of the spirit and scope of the invention. Modifications can readily be made by those skilled in the art consistent with the principles of the invention. More particularly, the invention provides for the use of a spacer layer 18 between a first component (e.g., a sensor) and a second component (e.g., a fiber optic faceplate) to provide an efficient technique and manufacturing process to control the gap between the first and second components without concern for tolerance variations in the first and second components. The controlled gap between the first and second components can be filled with a suitable coupling material when necessary. More particularly, the present invention is described hereinbefore relative to a CCD sensor 16 and a fiber optic faceplate 14. It is to be understood that the fiber optical faceplate could be any other suitable component such as, for example, a lens to focus a light beam from the optical fiber onto the sensor. Alternatively, the sensor 16 could be a laser, and the faceplate 14 could be a lens for focusing the light emitted from the laser into the core of an optical fiber (not shown) such as a single mode optical fiber.

What is claimed is:

1. A method for mounting on a first optical component which has a major surface with an active optical area for receiving lightwave and a non-active area, a second optical component which permits lightwaves to pass therethrough and impinge the active optical area of the first optical component, the method comprising the steps of:
   (a) forming a spacer layer comprising a predetermined thickness disposed only on at least a portion of the non-active area of the first optical component; and
   (b) fixedly mounting the second optical component on the spacer layer for forming a controlled gap between the second optical component and the active area of the first optical component.

2. The method of claim 1 wherein prior to performing step (b), performing the step of:
   (c) placing a layer of a coupling compound in contact with an active area of the first optical component, the coupling compound layer comprising a thickness equal to at least the predetermined thickness of the spacer layer.

3. The method of claim 2 wherein the coupling compound layer comprises an optical gel having an index of refraction that substantially matches the index of refraction of the second optical component.

4. The method of claim 1 wherein the first optical component is a light sensor.

5. The method of claim 4 wherein the second optical component is a fiber optic faceplate.

6. The method of claim 1 wherein the spacer layer comprises an epoxy or similar material.

7. An optical device comprising:
a first optical component comprising a surface comprising an active optical area for receiving lightwaves and a non-active area;
a spacer layer covering only a portion of the non-active area of the first optical component; and
a second optical component comprising a predetermined index of refraction which is fixedly mounted on the spacer layer to form a controlled gap between the active optical area of the first optical component and the second optical component.

8. An optical device comprising:
a first optical component having a surface which includes an active area for receiving lightwaves and a non-active area;
a spacer layer having a predetermined thickness formed only on at least a portion of the non-active area of the first optical component; and
a second optical component having a predetermined index of refraction which is fixedly mounted on the spacer layer to form a controlled gap between the active area of the first optical component and an opposing surface of the second optical component.

9. The optical device of claim 8 wherein the device further comprises a layer of a coupling compound having an index of refraction which substantially matches the index of refraction of the second optical component for filling the gap formed between the active area of the first optical component and the opposing surface of the second optical component.

10. The optical device of claim 9 wherein the coupling compound is an optical gel.

11. The optical device of claim 8 wherein the first optical component is an optical sensor.

12. The optical device of claim 11 wherein the second optical component is a fiber optic faceplate.

13. The optical device of claim 8 wherein the spacer layer comprises an epoxy or similar material.

14. An optical device comprising:
a CCD sensor having a surface which includes a non-active area and an active area for detecting lightwaves impinging thereon;
a spacer layer with a predetermined thickness formed only on a portion of the non-active area of the CCD sensor; and
a fiber optic faceplate fixedly mounted on the spacer layer to form a controlled gap between the faceplate and the active area of the CCD sensor, the fiber optic faceplate having a predetermined index of refraction for passing lightwaves in a direction towards the active area of the CCD sensor.

15. The optical device of claim 14 wherein the device further comprises a layer of a coupling compound having an index of refraction which substantially matches the index of refraction of the fiber optic faceplate for filling the controlled gap between the active area of the CCD sensor and the fiber optic faceplate.

16. The optical device of claim 15 wherein the coupling compound is an optical gel.

17. The optical device of claim 14 wherein the spacer layer comprises an epoxy or similar material.

* * * * *